United States Patent Office 2,970,973
Patented Feb. 7, 1961

2,970,973

TEREPHTHALIC AND ISOPHTHALIC ALKYD RESIN COMPOSITIONS CONTAINING A SALT OF 2-ETHYLHEXOIC ACID

John H. Thomas, Sanford, Mich., assignor to Dow Corning Corporation, Midland, Mich., a corporation of Michigan No Drawing. Filed May 29, 1958, Ser. No. 738,614

7 Claims. (Cl. 260—22)

This invention relates to improved alkyd resin compositions and to electrical conductors coated therewith.

Terephthalic and isophthalic alkyd resins have become well known in the magnet wire art for their improved thermal stability, solvent resistance, and general physical properties as compared to prior organic magnet wire enamels. Resins of this type, both in their purely organic form and in their so-called silicone-modified form, are well known and are fully described, e.g. in Kohl, U.S. Patent No. 2,686,739 and Goodwin, U.S. Patent No. 2,686,740, both issued August 17, 1954.

Although resins of the type described in the aforesaid patents represented a great improvement over the prior alkyd resins, a further improvement in their thermal stability and ease of handling in commercial wire coating processes was desirable. It is the primary object of this invention to bring about the desired improvements without sacrificing any of the other desirable physical properties of the resins in question.

In accordance with this invention, the terephthalic or isophthalic type alkyd resins have been found to be greatly improved in thermal stability by the addition thereto of a lead, cobalt, zirconium, or tin salt of 2-ethylhexoic acid in an amount of at least 1% by weight calculated as the metal and based on the weight of the resin solids. No attendant deterioration in other desirable properties is brought about by these specific salts, and the advantages accrue to the unmodified resins as well as to those which are modified with organosilicon compounds or fatty acids or both.

The invention thus can be broadly defined as encompassing the composition comprising any alkyd resin of the terephthalic or isophthalic type which contains at least 1% by weight, as the metal and based on the weight of the resin, of the above-defined salts. As is well known, the defined types of alkyd resins are comprised of the condensation products of a polyhydric alcohol, at least some of which is at least trihydric, with terephthalic or isophthalic acids or the lower alkyl esters of said acids. These resins are prepared in the conventional manner for making alkyd resins. The resins described in the Kohl and Goodwin patents above are eminently suitable herein, and those patents are hereby incorporated by reference.

Examples of the alcohols employed in making the defined resins include glycerine, pentaerythritol, trimethylol ethane, trimethylol propane, triethanol amine and any other trihydric or tetrahydric alcohols. In addition, the alcohols can consist of limited amounts of dihydric alcohols such as ethylene glycol, propylene glycol, octylene glycol and diethanol amine. In general it is preferred that the dihydric alcohols be present in amount less than 50% by weight of the total polyhydric alcohol in the alkyd resin.

The essential acids employed in the formulation of the materials of this invention are terephthalic and isophthalic acids and their lower alkyl esters such as dimethyl terephthalate, diethylisophthalate, diisopropylterephthalate, methylethylterephthalate and dioctylterephthalate.

If desired, minor amounts of aliphatic dibasic acids such as maleic acid, malonic acid, adipic acid, sebacic acid, cyclohexyldicarboxylic acid or their anhydrides and esters may be employed.

If desired, the alkyd resins employed in the coatings of this invention may be modified with up to 75% by weight of an organosilicon compound of the formula

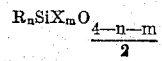

in which R is a monovalent hydrocarbon radical, X is a functional radical of the group halogen atoms, alkoxy radicals, silicon-bonded hydroxyl radicals, hydroxylated monovalent hydrocarbon radicals, and radicals of the formula ZOOCB— in which Z is of the group hydrogen and lower alkyl radicals and B is a divalent hydrocarbon radical, $n$ has an average value from 1 to 3 inclusive and $m$ has an average value from .01 to 3 inclusive.

The term "functional group" as used herein means that the group is capable of reacting with the OH, COOH or COOAlk groups in the alkyd resin whereby the organosilicon compound is chemically linked to the alkyd molecules. When the reaction takes place through halogen, alkoxy or silanol OH groups the silicon compound is linked to the alkyd by SiOC (i.e. silicon ester) linkages. When reaction takes place through hydroxylate hydrocarbon radicals or radicals of the type ZOOCB—, the silicon compound is linked to the alkyd through

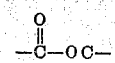

(i.e. organic ester) linkages. In the latter case it is not necessary that the silicon compound contain any halogen, alkoxy or silanol OH groups. However, these may be present, if desired, in which case the silicon compound will be linked to the alkyd by both SiOC— and

linkages.

The organosilicon compounds can be reacted with the condensation product of the polyhydric alcohol and the terephthalic and isophthalic acid at any stage of the preparation of these alkyd resins. That is, the organosilicon compound may be first reacted with the alcohol which is subsequently reacted with the acid or the alcohol and the acid may be reacted first and the organosilicon compound thereafter reacted with the residue.

It can be seen from the formula that the organosilicon compounds which can be employed in the resins of this invention can be either monomeric materials such as halosilanes, alkoxysilanes or silanols or polymeric materials, namely siloxanes which contain some X groups. These siloxanes can be either partially condensed (i.e. contain some residual silanol OH) or they can be completely condensed (i.e. contain no SiOH groups). The preparation of such siloxanes is well known in the art. It can also be seen that any one silicon atom may have from 1 to 3 nonhydrolyzable organic radicals attached thereto and that the organosilicon compound can be a mixture or a copolymer containing silicon atoms having varying numbers of nonhydrolyzable organic radicals attached thereto. In all cases the total number of R groups and X groups on any one silicon atom cannot exceed 4.

Specific examples of operative organosilicon compounds which may be employed in the compositions of this invention are dimethyldichlorosilane,
dibutyldiisopropoxysilane,
phenylmethyldiethoxysilane,
divinyldibutoxysilane,
tolyltriethoxysilane, cyclohexyltrimethoxysilane,
phenylmethyldibromosilane,
stearylmethyldiethoxysilane,
allylstearyloxydimethoxysilane,
diphenylsilane diol,
phenylmethylsilane diol,
octadecylmethylsilane diol,
bis-gammahydroxypropyldimethylsilane,
gammahydroxypropylphenyldimethoxysilane,
carboxyphenylmethyldimethoxysilane and

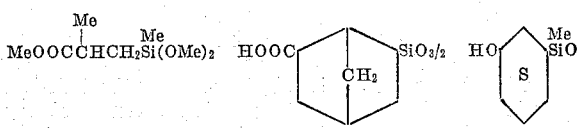

copolymers of PhMeSiO and

and mixtures thereof. It is to be understood that the foregoing list is merely representative of the organosilicon compounds operable in this invention and is not a complete and exclusive listing.

In addition to being modified by organosilicon compounds the alkyd resins employed in this invention may also be modified by fatty acids. When employed the fatty acids are used in amount of less than 75% by weight, preferably less than 35% by weight of the polyhydric alcohol-terephthalic or isophthalic condensation product.

Specific examples of fatty acids which may be employed herein include acetic acid, propionic acid, octonoic acid, capric acid, lauric acid, myristic acid, palmitic acid, stearic acid, behinic acid, oleic acid, erucic acid, recinoleic acid, linoleic acid, linolenic acid and arachidonic acid. It should be understood of course that these acids may be employed per se or as the glyceride.

The fatty acid modification may be employed in conjunction with the organosilicon modification or in lieu thereof.

The preferred modified alkyd resins employed in this invention can thus be defined as the reaction product of (a) from 25 to 100% by weight of the condensation product of a polyhydric alcohol and terephthalic and isophthalic acids or their lower alkyl esters, (b) from 0 to 75% by weight of the defined organosilicon compounds and (c) from 0 to 75% by weight of the defined fatty acids.

In addition to the primary modifications stated above the alkyd resins employed in this invention may also be modified with phenolaldehyde resins, polyvinylacetal resins, epoxy resins or other organic resins suitable for coating. When such modifications are employed the amount of organosilicon compound and fatty acid modification, if any, is reduced proportionately.

The compositions of this invention can best be prepared by merely cold blending an organic solvent solution of the defined alkyd resin with an organic solvent solution of one or more of the defined salts. The salts are soluble in a wide variety of solvents, and are commercially available in the form of solutions in hydrocarbon solvents such as mineral spirits and V.M. and P. Naphtha. The alkyds are also soluble in a wide variety of solvents, illustrative of which are tertiary amines such as quinoline, isoquinoline, tributylamine, triisobutylamine and triamylamine; ketones such as isophorone, acetopheonone and acetonylacetone; dialkyl-substituted amides such as dimethylformamide, diethylformamide and dimethyl acetamide; esters of fatty acids such as 2-ethylhexylacetate, laurylacetate, 2-ethylhexylbutyrate; and diesters, diethers and ester-ethers of ethylene glycol and polyethylene glycols such as butyl Carbitol acetate, butyl Cellosolve acetate, amyl Carbitol acetate, diethyleneglycoldipropionate, phenoxyethyleneglycolacetate and diethyl Carbitol. The preferred solvent, however, is cresol (a mixture of methylphenols), mixed if desired with "W.E.S. Oil" (wire enamel solvent—Barrett Div., Allied Chemical and Dye Corporation) in, e.g., a 2:1 ratio.

The salts can be added singly or in any desired combination, but there should be added an amount sufficient to provide at least 1% by weight, based on the resin solids, calculated as the metal. Preferably not more than 4 to 5% (on this basis) is added.

The composition of this invention when in the form of a solution can be adjusted to any desired concentration of resin solids for storage or shipping purposes. Ordinarily it will be adjusted to a concentration of from about 25% to 50% by weight resin solids for purposes of commercial application. The composition can be used as a laminating resin, molding resin, and the like, but its major use is as a coating agent, particularly as a magnet wire enamel. The composition can be applied to electrical conductors by any conventional coating technique, such as dip coating or die coating. It is ordinarily then cured to the desired non-tacky, solvent-resistant state at temperatures of, e.g. 200° to 515° C.

The improvement in thermal stability brought about by the addition of the defined salts is particularly noticeable in the so-called "heat shock" and "varnish shock" tests. In these tests, a copper wire is coated with the resin to be tested and the resin is cured. The wire is then wound around mandrels which vary in diameter from 1 through 6 times the diameter of the wire. The wound mandrel is then heated at 200° C. for 1 hour, and the "heat shock" value is the smallest mandrel at which the coating is intact, reported in terms of the multiple of the wire diameter. Thus a "4X" heat shock value means that the coating did not crack when the wire was wound around a mandrel which was four times the diameter of the wire and subjected to the test temperature.

The "varnish shock" test is the same, except that before being heated at 200° C. for 1 hour, the wound mandrel is dip coated with a solution of an organosiloxane electrical varnish. This latter test is an extremely rugged one, for it exposes the first coating to the attack of the powerful hydrocarbon solvent (e.g., xylene), present in the second resin solution.

The results obtained by incorporating the defined metal salts in the defined alkyd resins are greatly surprising, for the comparable salts of other acids and those salts which contain different metal atoms lead either to no improvement whatsoever or to an actual degradation of properties. For example, in the 2-ethylhexoate series the iron, copper, potassium, nickel, and molybdenum salts all greatly lower the thermal resistance of the resin, and the magnesium salt destroys the water resistant properties normally inherent in such resins.

The following examples are illustrative only. All parts are parts by weight.

*Example 1*

The alkyd resin in the procedure of this example was prepared by reacting 369 parts glycerine, 140 parts ethylene glycol, 75 parts triethanol amine, 1164 parts dimethylterephthalate, 18 parts of a partially hydrolyzed phenylmethyldimethoxysilane containing 30% by weight methoxy groups, in the presence of 140 parts of isophorone and 6 parts of magnesium acetate. The mixture was heated 17 hours at a temperature up to 240° C. during which time methanol was removed and the viscosity of the mixture increased to the desired point. The resulting product was then diluted to 40% by weight solids by the addition of a solvent consisting of 2 parts cresol per 1 part "W.E.S. Oil."

Portions of this solution were respectively mixed with mineral spirits solutions of lead, cobalt, zirconium, or tin 2-ethylhexoate. The amounts of each salt employed were such that each solution respectively contained from 1 to 4 inclusive percent by weight of lead, cobalt, zirconium, or tin per se, based on the weight of the resin solids. Each solution was then employed to die coat No.

18 AWG copper wire by passing the wire through the solution, then through the die, and then through a curing tower where the temperature ranged up to 500° C. The wire was passed through the solution and tower at a speed of up to 30 feet per minute, and six consecutive coatings were applied in this manner to give a final differential of about 0.03 inch between the diameters of the bare and the coated wire. A portion of the original resin solution to which no salt had been added was likewise used to coat the wire, as a control sample for test purposes.

Some of the coated wires were then tested by the heat shock and varnish shock tests described above. In the varnish shock test, the organosiloxane electrical varnish employed was "Dow Corning 997 Varnish," containing 52% resin solids in xylene. The results obtained are shown in Table I below.

TABLE I

| Salt Additive | Percent | Heat Shock | Varnish Shock |
|---|---|---|---|
| None | | 6 | 6 |
| Pb | 1 | 4 | 3 |
| Pb | 4 | 4 | 4 |
| Sn | 1 | 4 | 4 |
| Co | 1 | 3 | 3 |
| Zr | 1 | 1.5 | 1.5 |

The difference between values of 6 and values of 4 or less in the above tests are of significant importance in the commercial processes used in making magnet wire windings.

Other samples of the coated wires were also dip coated in "Dow Corning 997 Varnish" and their thermal life determined in accordance with A.I.E.E. Test No. 57. This test comprises heating the wires at stated temperatures (in this case, 225° C.) and periodically checking the wire for failure of the insulation at a test voltage of 1 kv. Those coatings containing lead averaged about 3000 hours before failure, those containing tin and cobalt averaged about 2400 hours, and a comparable coating containing 0.5% each of tin and lead ran for 3200 hours before failure. The coatings containing no added salts averaged about 2000 hours under this test.

As a comparison to show the effect of other salts, wires coated as above with the same basic resin but containing the iron, copper, nickel, or molybdenum salt of 2-ethylhexoic acid only ran about 300, 400, 200, and 80 hours respectively in the above A.I.E.E. test.

*Example 2*

The alkyd resin employed in this example was prepared by reacting 370 parts of glycerine, 184 parts ethylene glycol and 1164 parts dimethyl terephthalate in the presence of 140 parts of isophorone and 6 parts of magnesium acetate. The reaction was carried out by heating the mixture for 13 hours at a temperature up to 240° C.

A second resin was prepared by reacting 552 parts glycerine, 186 parts ethylene glycol, 1552 parts dimethyl terephthalate and 400 parts of phenylmethyldimethoxysilane, in the presence of 226 parts of isophorone and 6 parts magnesium acetate. The mixture was reacted by heating 19 hours at a temperature up to 233° C.

A third resin was prepared by heating 46 parts of glycerine and 105 parts of isophthalic acid in 200 parts of butyl Carbitol acetate at 240° C. with stirring for 2½ hours.

72.4 parts of pentaerythritol, 148 parts of terephthalic acid, 70 parts of linseed oil fatty acid and 200 parts of butyl Carbitol acetate were mixed and heated at 260° C. for 7 hours to make a fourth resin.

A fifth resin contained 98 parts glycerine, 388 parts dimethyl terephthalate and 180 parts of hydroxypropylphenylsiloxane reacted in the presence of 140 parts of isophorone and 6 parts of magnesium acetate for 17 hours at a temperature up to 240° C.

A sixth resin was made from 98 parts glycerine, 194 parts dimethyl terephthalate and 160 parts

reacted as in No. 5.

The seventh resin was prepared from a mixture of 46 parts of glycerine, 84.6 parts of terephthalic acid, 71 parts of linseed oil fatty acid and 100 parts of butyl Carbitol acetate heated 2 hours at 260° C. The reaction mixture was cooled and 20 parts of phenyltriethoxysilane were added. The mixture was agitated and heated 1 hour at 260° C. as ethanol was removed.

For the eighth resin, 92 parts of glycerine, 166 parts of terephthalic acid, 142 parts of linseed fatty acid and 400 parts of isophorone were mixed and heated at 214 to 225° C. for 11 hours. The mixture was cooled to 180° C. and 638 parts of a siloxane copolymer of the composition 33⅓ mol percent each of phenylmethylsiloxane, monophenylsiloxane and monomethylsiloxane, which copolymer contained 1.89 weight percent silicon-bonded OH groups, was added as a 70 weight percent toluene solution. Heating was continued at 160 to 180° C. for 5 hours during which time 150 parts of isophorone, 200 parts of cresylic acid and 100 parts of dimethylformamide were added as additional solvent.

When each of these resins is mixed with 1% as the metal, based on the resin solids, of the lead, cobalt, zirconium, or tin 2-ethylhexoate salts, the thermal stability of the original resin is improved.

That which is claimed is:

1. A resinous composition comprising a mixture of an alkyd resin selected from the group consisting of terephthalic and isophthalic alkyd resins, and at least 1% by weight as the metal, based on the weight of the resin, of a salt selected from the group consisting of the lead, cobalt, tin and zirconium salts of 2-ethylhexoic acid.

2. A resinous composition comprising a solution of (1) a condensation product of a polyhydric alcohol, at least some of which alcohol is at least trihydric, and a compound of the group consisting of terephthalic and isophthalic acids and the lower alkyl esters of said acids in which the alkyl radicals contain from 1 to 8 inclusive carbon atoms, (2) at least 1% by weight as the metal, based on the weight of (1), of a salt selected from the group consisting of the lead, cobalt, tin and zirconium salts of 2-ethylhexoic acid, and (3) an organic solvent for (1) and (2).

3. An article of manufacture comprising an electrical conductor coated with a cured composition comprising (1) a condensation product of a polyhydric alcohol, at least some of which alcohol is at least trihydric, and a compound of the group consisting of terephthalic and isophthalic acids and the lower alkyl esters of said acids in which the alkyl radicals contain from 1 to 8 inclusive carbon atoms, and (2) at least 1% by weight as the metal, based on the weight of (1), of a salt selected from the group consisting of the lead, cobalt, tin and zirconium salts of 2-ethylhexoic acid.

4. A resinous composition comprising a solution of (1) an alkyd resin which is a condensation product of
   (a) from 25 to 100% by weight of the reaction product of a polyhydric alcohol, at least some of which alcohol being at least trihydric, and a compound of the group consisting of terephthalic and isophthalic acids and lower alkyl esters of said acids in which the alkyl radicals contain from 1 to 8 inclusive carbon atoms.
   (b) from 0 to 75% by weight of an organosilicon compound of the formula $$R_nSiX_mO_{\frac{4-n-m}{2}}$$

in which R is a monovalent hydrocarbon radical, X is selected from the group consisting of halogen atoms, alkoxy radicals, silicon bonded hydroxyl radicals, hydroxylated monovalent hydrocarbon radicals and radicals of the formula ZOOCB— in which Z is of the group consisting of hydrogen and lower alkyl radicals and B is a divalent hydrocarbon radical, $n$ has an average value from 1 to 3 inclusive and $m$ has an average value from .01 to 3 inclusive, and (c) from 0 to 75% by weight of a fatty acid, and (2) at least 1% by weight as the metal, based on the weight of (1), of a salt selected from the group consisting of the lead, cobalt, tin and zirconium salts of 2-ethylhexoic acid, and (3) an organic solvent for (1) and (2).

5. An article of manufacture comprising an electrical conductor coated with a cured composition comprising (1) an alkyd resin which is a condensation product of (a) from 25 to 100% by weight of the reaction product of a polyhydric alcohol, at least some of which alcohol being at least trihydric, and a compound of the group consisting of terephthalic and isophthalic acids and lower alkyl esters of said acids in which the alkyl radicals contain from 1 to 8 inclusive carbon atoms, (b) from 0 to 75% by weight of an organosilicon compound of the formula

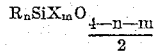

in which R is a monovalent hydrocarbon radical, X is selected from the group consisting of halogen atoms, alkoxy radicals, silicon-bonded hydroxyl radicals, hydroxylated monovalent hydrocarbon radicals and radicals of the formula ZOOCB— in which Z is of the group consisting of hydrogen and lower alkyl radicals and B is a divalent hydrocarbon radical, $n$ has an average value from 1 to 3 inclusive and $m$ has an average value from .01 to 3 inclusive, and (c) from 0 to 75% by weight of a fatty acid, and (2) at least 1% as the metal, based on the weight of (1), of a salt selected from the group consisting of the lead, cobalt, tin and zirconium salts of 2-ethylhexoic acid.

6. A resinous composition comprising a solution of (1) an alkyd resin which is a condensation product of (a) from 25 to 100% by weight of the reaction product of glycerine, ethylene glycol, and dimethyl terephthalate, (b) from 0 to 75% by weight of a phenylmethyl silicone of the formula

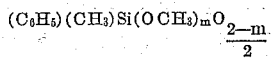

where $m$ has a value of from 0.01 to 2 inclusive, (2) at least 1% by weight as the metal, based on the weight of (1), of a metal salt selected from the group consisting of the lead, cobalt, tin and zirconium salts of 2-ethylhexoic acid, and (3) an organic solvent for (1) comprising cresol.

7. An electrical conductor coated with a cured composition comprising (1) an alkyd resin which is a condensation product of (a) from 25 to 100% by weight of the reaction product of glycerine, ethylene glycol, and dimethyl terephthalate, (b) from 0 to 75% by weight of a phenylmethyl silicone of the formula

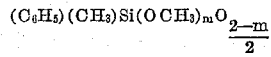

where $m$ has a value of from 0.01 to 2 inclusive, and (2) at least 1% by weight as the metal, based on the weight of (1), of a metal salt selected from the group consisting of the lead, cobalt, tin and zirconium salts of 2-ethylhexoic acid.

References Cited in the file of this patent

UNITED STATES PATENTS

| | | |
|---|---|---|
| 2,476,833 | Albert | July 19, 1949 |
| 2,686,739 | Kohl | Aug. 17, 1954 |
| 2,720,500 | Cody | Oct. 11, 1955 |
| 2,742,368 | Rossiter et al. | Apr. 17, 1956 |